United States Patent
Rao et al.

(10) Patent No.: US 10,846,183 B2
(45) Date of Patent: Nov. 24, 2020

(54) METHOD AND APPARATUS FOR ENSURING DATA INTEGRITY IN A STORAGE CLUSTER WITH THE USE OF NVDIMM

(71) Applicant: DELL PRODUCTS, LP, Round Rock, TX (US)

(72) Inventors: Balaji Bapu Gururaja Rao, Austin, TX (US); Syama S. Poluri, Round Rock, TX (US); Chandrashekar Nelogal, Round Rock, TX (US)

(73) Assignee: Dell Products, L.P.

( * ) Notice: Subject to any disclaimer, the term of this patent is extended or adjusted under 35 U.S.C. 154(b) by 131 days.

(21) Appl. No.: 16/004,822

(22) Filed: Jun. 11, 2018

(65) Prior Publication Data

US 2019/0377647 A1    Dec. 12, 2019

(51) Int. Cl.
*G06F 11/16* (2006.01)
*G06F 3/06* (2006.01)
(Continued)

(52) U.S. Cl.
CPC .......... *G06F 11/1662* (2013.01); *G06F 3/067* (2013.01); *G06F 3/0617* (2013.01);
(Continued)

(58) Field of Classification Search
CPC ............. G06F 11/1425; G06F 11/1471; G06F 3/0653; G06F 3/067; G06F 3/0919;
(Continued)

(56) References Cited

U.S. PATENT DOCUMENTS 7,290,019 B2 * 10/2007 Bjorner ............... G06F 12/0253
707/638
7,434,107 B2    10/2008 Marks
(Continued)

OTHER PUBLICATIONS

Franz Faerber et al., "Main Memory Database Systems", now Publishers Inc., Foundations and Trends in Databases vol. 8 No. 1-2, pp. 1-130 (Year: 2016).*

(Continued)

*Primary Examiner* — Reginald G Bragdon
*Assistant Examiner* — Curtis James Kortman
(74) *Attorney, Agent, or Firm* — Larson Newman, LLP

(57) ABSTRACT

An information handling system includes a persistent storage and a memory controller. The persistent storage includes a volatile memory and a non-volatile memory. The memory controller stores data and metadata for a data file within the volatile memory, and the data file is synchronized within other information handling systems of a storage cluster. The memory controller updates the metadata in response to a change in the data of the data file, stores the data and the metadata for the data file within the non-volatile memory prior to a power loss of the information handling system, and synchronizes the data and the metadata of the data file with current data and current metadata for the data file found in the other information handling systems in response to the information handling system being back online. The data is synchronized with the current metadata based on a transform for the data file being received from the other information handling systems.

18 Claims, 5 Drawing Sheets

(51) Int. Cl.
*G06F 11/14* (2006.01)
*G06F 16/27* (2019.01)

(52) U.S. Cl.
CPC ........ *G06F 3/0653* (2013.01); *G06F 11/1471* (2013.01); *G06F 16/273* (2019.01); *G06F 2201/835* (2013.01)

(58) Field of Classification Search
CPC ......... G06F 16/27–278; G06F 11/1662; G06F 3/0617; G06F 2201/835
See application file for complete search history.

(56) References Cited

U.S. PATENT DOCUMENTS

| | | | |
|---|---|---|---|
| 7,506,007 B2* | 3/2009 | Bjorner | G06F 16/1844 |
| 7,660,833 B2* | 2/2010 | Teodosiu | G06F 16/1844 |
| | | | 707/999.203 |
| 7,788,223 B2* | 8/2010 | Liu | G06F 16/273 |
| | | | 707/618 |
| 2004/0093361 A1* | 5/2004 | Therrien | G06F 11/1448 |
| 2006/0242453 A1 | 10/2006 | Kumar et al. | |
| 2014/0229695 A1 | 8/2014 | Dinkar et al. | |
| 2015/0169238 A1* | 6/2015 | Lee | G06F 12/0871 |
| | | | 711/103 |

OTHER PUBLICATIONS

HPE 8GB NVDIMM User Guide, Dec. 2016, Hewlett Packard Enterprise, Edition 3, pp. 1-34 (Year: 2016).*
Persistent Memory, Dec. 28, 2016, Hewlett Packard Enterprise, pp. 1-5 https://web.archive.org/web/20161228170445/https://www.hpe.com/us/en/servers/persistent-memory.html (Year: 2016).*

* cited by examiner

METHOD AND APPARATUS FOR ENSURING DATA INTEGRITY IN A STORAGE CLUSTER WITH THE USE OF NVDIMM

FIELD OF THE DISCLOSURE

The present disclosure generally relates to information handling systems, and more particularly relates to an information handling system to ensure data integrity in a storage cluster with the use of non-volatile dual-inline memory modules.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a persistent storage and a memory controller. The persistent storage includes a volatile memory and a non-volatile memory. The memory controller may store data and metadata for a data file within the volatile memory, and the data file is synchronized within other information handling systems of a storage cluster. The memory controller may update the metadata in response to a change in the data of the data file, may store the data and the metadata for the data file within the non-volatile memory prior to a power loss of the information handling system, and may synchronize the data and the metadata of the data file with current data and current metadata for the data file found in the other information handling systems in response to the information handling system being back online. The data may be synchronized with the current metadata based on a transform for the data file being received from the other information handling systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
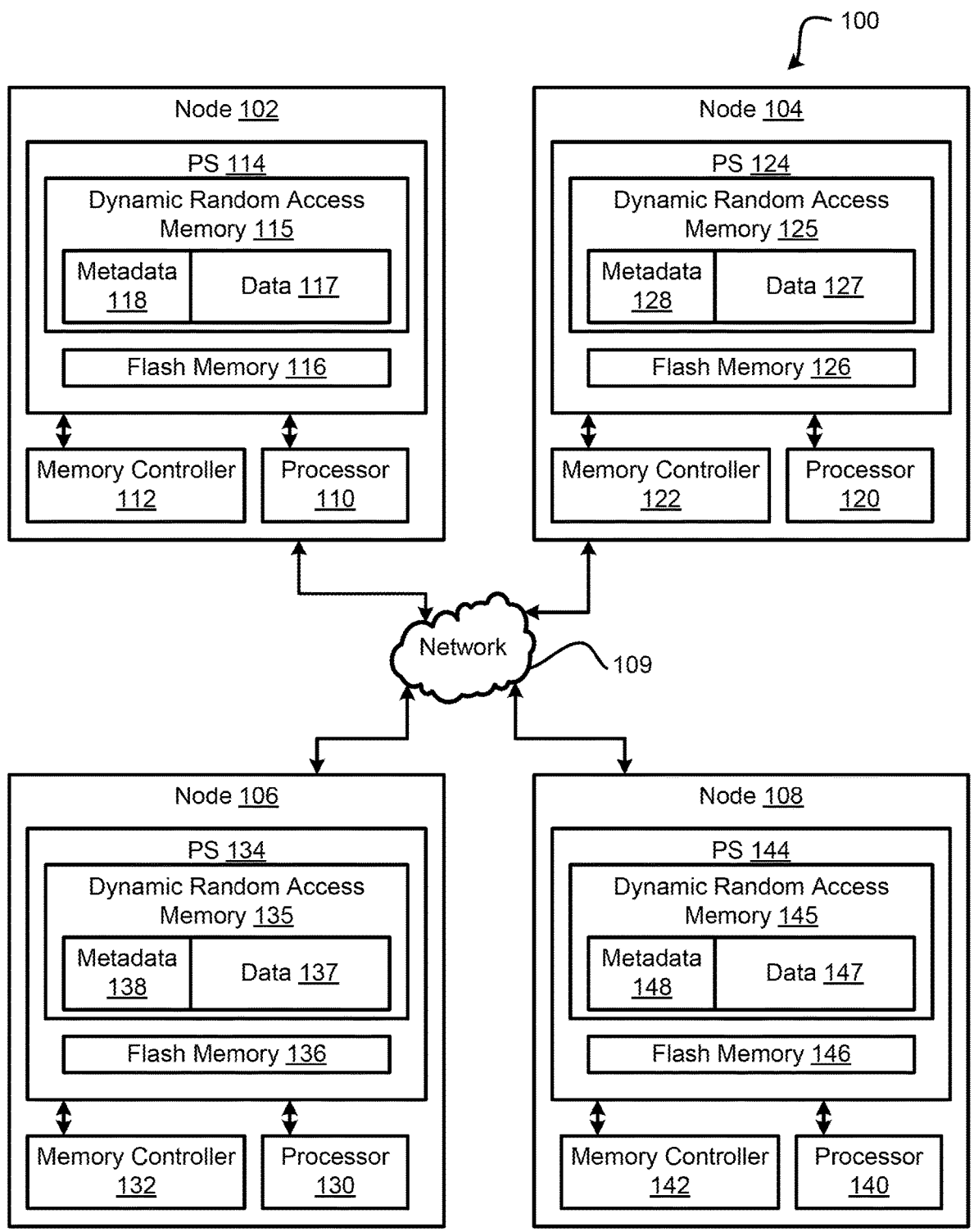
FIGS. 1-3 are block diagrams of a storage cluster including multiple information handling systems according to at least one embodiment of the disclosure.
Figure 2:
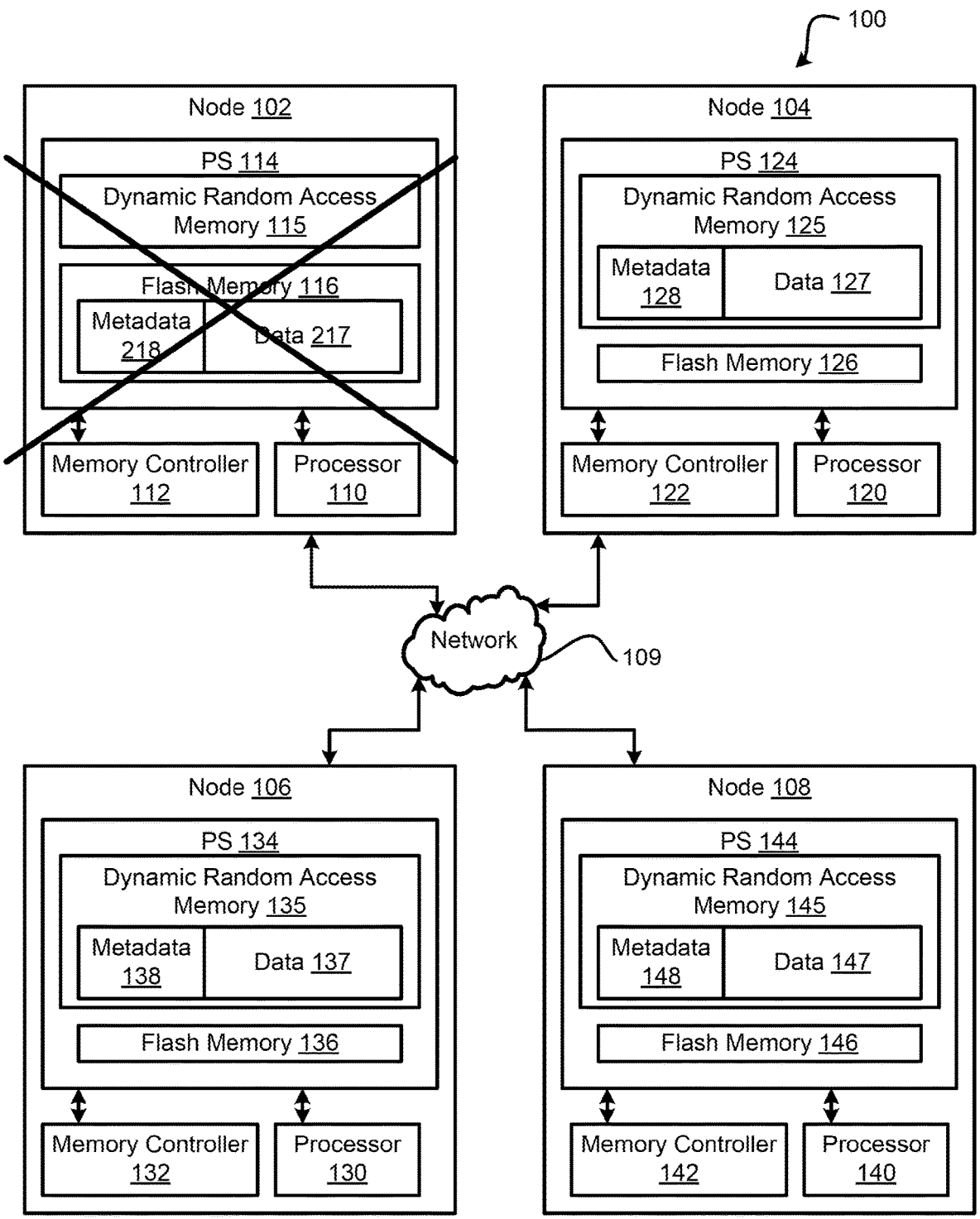
Figure 3:
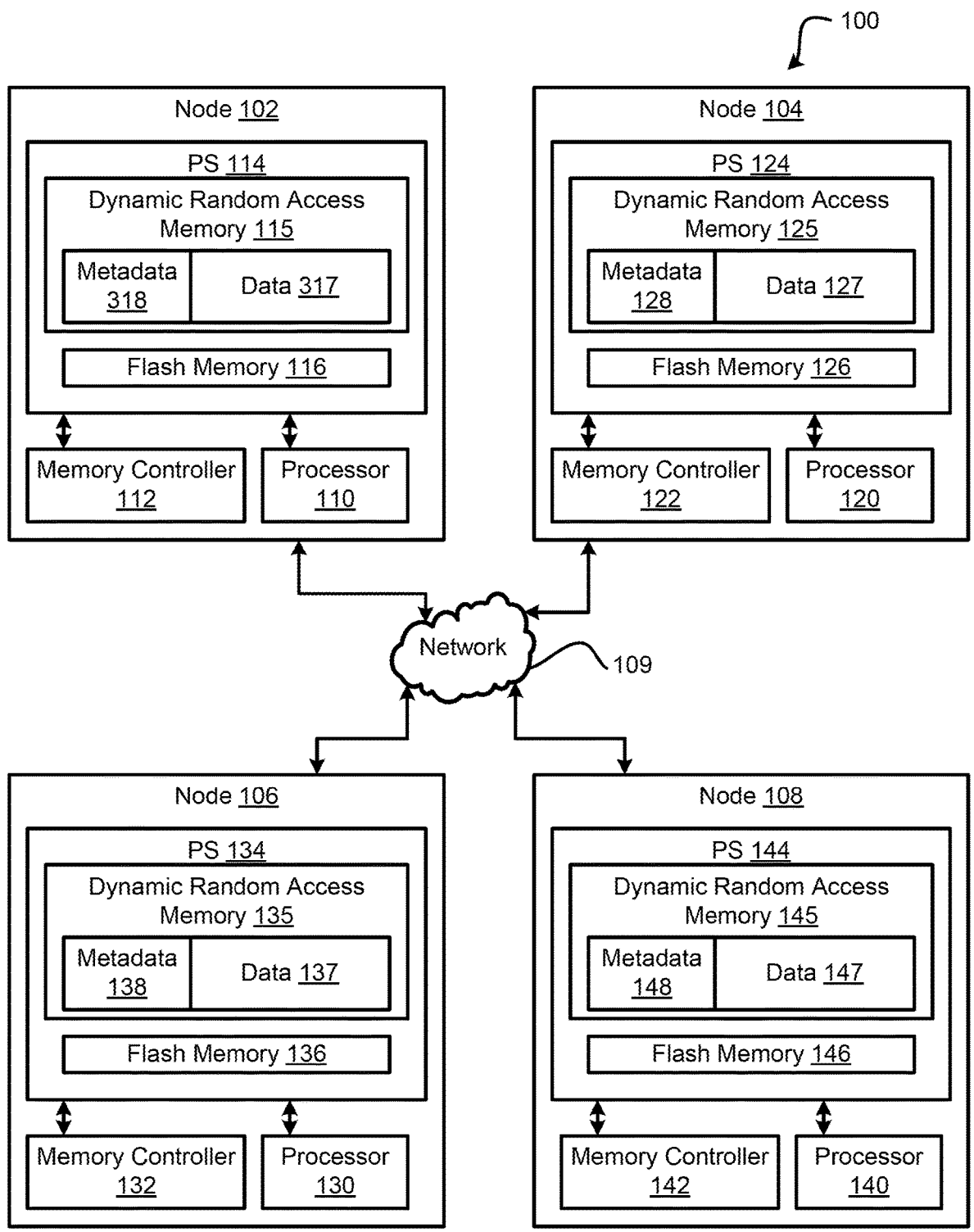

FIGS. 1-3 show a system or a storage cluster 100 including information handling systems or nodes 102, 104, 106, and 108. The storage cluster 100 can be a distributed file system running concurrently on the nodes 102, 104, 106, 108. For example, the storage cluster 100 can be a network attached storage (NAS) cluster, a block storage cluster, or the like. The nodes 102, 104, 106, and 108 can communicate with each other via a network 109. In an embodiment, the network 109 can be a Gen-Z network, such that the nodes 102, 104, 106, and 108 can connect to and communicate with one another with access layer issues even if the nodes 102, 104, 106, and 108 are different types of media. For example, the nodes 102, 104, 106, and 108 can be any combination of SATA, SAS, or like and the Gen-Z network 109 can provide a common connection to enable communication between the nodes 102, 104, 106, and 108. One of ordinary skill in the art would recognize that Gen-Z is only one type of network that could enable communication between the nodes 102, 104, 106, and 108 of the storage cluster 100, and that any type of network could be utilized without varying from the scope of this disclosure.

The node 102 includes a processor 110, a memory controller 112, and a persistent storage 114. In an embodiment, the persistent storage 114 can be a non-volatile dual in-line memory module (NVDIMM). The persistent storage 114 includes a volatile memory 115 and a non-volatile memory 116. In an embodiment, the volatile memory 115 can be a dynamic random access memory (DRAM) and the non-volatile memory 116 can be a flash memory. The node 104 includes a processor 120, a memory controller 122, and a persistent storage 124. In an embodiment, the persistent storage 124 can be a NVDIMM. The persistent storage 124 includes a volatile memory 125 and a non-volatile memory 126. In an embodiment, the volatile memory 125 can be a DRAM and the non-volatile memory 126 can be a flash memory.

The node 106 includes a processor 130, a memory controller 132, and a persistent storage 134. In an embodiment, the persistent storage 134 can be a NVDIMM. The persistent storage 134 includes a volatile memory 135 and a non-volatile memory 136. In an embodiment, the volatile memory 135 can be a DRAM and the non-volatile memory 136 can be a flash memory. The node 108 includes a processor 140, a memory controller 142, and a persistent storage 144. In an embodiment, the persistent storage 144 can be a NVDIMM. The persistent storage 144 includes a volatile memory 145 and a non-volatile memory 146. In an embodiment, the volatile memory 145 can be a DRAM and the non-volatile memory 146 can be a flash memory.

The storage cluster 100 can provide replication of files and fault tolerance to all of the nodes 102, 104, 106, and 108. For example, if one or more nodes 102, 104, 106, and 108 fail, the storage cluster 100 can continue to function without any data loss. Then when the failed node 102, 104, 106, or 108 recovers and re-joins the storage cluster 100, the recovered node can have stale data. However, the persistent storages 114, 124, 134, and 144 within the respective nodes 102, 104, 106, and 108 can provide a challenge to the storage cluster 100. For example, if the node 102 fails in response to a power loss, data 117 and metadata 118 stored within the volatile memory 114 of persistent storage 114 can be stored in the non-volatile memory 116. When the node 102 recovers, the data 117 and metadata 118 can be restored to the volatile memory 115. Then when the node 102 re-joins the storage cluster 100, the data 117 and metadata 118 is restored from the point of view of the node 102, but the data 117 and metadata 118 may be stale from the point of view of the storage cluster 100. Thus, an improved restore operation of the data and metadata in the storage cluster 100 with the nodes 102, 104, 106, and 108 that include respective persistent storage 114, 124, 134, and 144.

For brevity and clarity, the operation of the storage cluster 100 will be described with respect to nodes 102, 104, 106, and 108 updating data within the storage cluster 100, such as data files A and B. However, the storage cluster 100 can include additional or fewer nodes and the node can store additional or fewer data files without varying from the scope of this disclosure. Additionally, while the data being updated in the storage cluster is labeled herein as a data file, the updating and maintaining of data integrity can be applied to any type of data, such as objects, metadata, application data, or the like, without varying from the scope of this disclosure. During operation of the storage cluster 100, each time one of the data files is updated the nodes 102, 104, 106, and 108 update the data file and store metadata associated with the data file. For example, the metadata can include a timestamp of when the update occurred and a file change delta from a previous timestamp. In an embodiment, the metadata can include additional information including the node where the data file originated, or the like.

During operation of the storage cluster 100, the nodes 102, 104, 106, and 108 can exchange heartbeat signals, which can provide the other nodes within the storage cluster 100 a snapshot of the storage cluster 100, such as what nodes are currently connected to the storage cluster. The nodes 102, 104, 106, and 108 can also exchange metadata for the data files stored within the nodes 102, 104, 106, and 108. In an embodiment, the metadata can be exchanged periodically and each of nodes 102, 104, 106, and 108 can use the metadata from the other nodes to verify data integrity within the storage cluster 100.

At a time T1, files A and B can be stored on one of the nodes 102, 104, 106, and 108, such as node 104, and copied to the other nodes 102, 106, and 108 to maintain data integrity within the storage cluster 100. At this point, T1, the metadata 118 stored within the persistent storage 114 of node 102, the metadata 128 stored within the persistent storage 124 of node 104, the metadata 138 stored within the persistent storage 134 of node 106, and the metadata 148 stored within the persistent storage 144 of node 108 can each have a timestamp entry of T1 without any changes to file A or B as shown in Table 1 below.

TABLE 1

| Node | Metadata | | |
|------|----------|---|---|
| N1 | TimeStamp T1 | File A Changes — | File B Changes — |
| N2 | TimeStamp T1 | File A Changes — | File B Changes — |
| N3 | TimeStamp T1 | File A Changes — | File B Changes — |
| N4 | TimeStamp T1 | File A Changes — | File B Changes — |

At time T2, file A can change on node 104, and node 104 can provide the updated file A to the other nodes 102, 106, and 108. Upon the nodes 102, 104, 106, and 108 storing the updated file A as respective data 117, 127, 137, and 147 in the respective persistent memories 114, 124, 134, and 136, each node can hash the metadata for file A to determine the change in file A and store the change. At this point, the metadata 118 stored within the persistent storage 114 of node 102, the metadata 128 stored within the persistent storage 124 of node 104, the metadata 138 stored within the persistent storage 134 of node 106, and the metadata 148 stored within the persistent storage 144 of node 108 can each have a timestamp entry of T1 without any changes to file A or B and a timestamp entry of T2 with ΔA12 for file A and no change for file B as shown in Table 2 below.

TABLE 2

| Node | Metadata | | |
|------|----------|---|---|
| N1 | TimeStamp T1 T2 | File A Changes — ΔA12 | File B Changes — — |
| N2 | TimeStamp T1 T2 | File A Changes — ΔA12 | File B Changes — — |
| N3 | TimeStamp T1 T2 | File A Changes — ΔA12 | File B Changes — — |
| N4 | TimeStamp T1 T2 | File A Changes — ΔA12 | File B Changes — — |

Each of the nodes 102, 104, 106, and 108 can provide a heartbeat to the other nodes 102, 104, 106, and 108 to indicate that the node is still present on the storage cluster 100. Each of the nodes 102, 104, 106, and 108 can also exchange hashed metadata to verify data integrity within the storage cluster 100. In an embodiment, the heartbeats and the exchanged metadata can each be provided by the nodes 102, 104, 106, and 108 periodically. However, in an embodiment the hashed metadata can exchanged less often than the heartbeats.

While the nodes 102, 104, 106, and 108 are providing periodic heartbeats, one of the nodes, such as node 102, can lose power or otherwise be removed from the storage cluster 100 as shown by the X across node 102 in FIG. 2. In this situation, the other nodes 104, 106, and 108 can deduce the absence of node 102 based on these nodes 104, 106, and 108 not receiving a heartbeat from node 102. Before the node 102 is removed from the storage cluster 100, the memory controller 112 can cause the data 217 and metadata 217 to be transferred from the volatile memory 115 to the non-volatile memory 116.

At a point in time T3, the file B can be updated on one of the nodes 104, 106, and 108, such as node 104, remaining in the storage cluster 100. The node 104 can then provide the updated data for file B to the other nodes 106 and 108. Each of the nodes 104, 106, and 108 storing the updated file B as respective data 127, 137, and 147 in the respective persistent memories 124, 134, and 136, can hash the metadata for file B to determine the change in file B and can store the change. At this point, the metadata 128 stored within the persistent storage 124 of node 104, the metadata 138 stored within the persistent storage 134 of node 106, and the metadata 148 stored within the persistent storage 144 of node 108 can each have a timestamp entry of T1 without any changes to file A or B, a timestamp entry of T2 with ΔA12 for file A and no change for file B, and a timestamp entry of T3 with ΔA12 for file A and ΔB12 for file B as shown in Table 3 below. However, the metadata 118 stored within the non-volatile memory 116 of persistent storage 114 in node 102 can remain the same as previously stored with a timestamp entry of T1 without any changes to file A or B and a timestamp entry of T2 with ΔA12 for file A and no change for file B, as shown in Table 3 below, based on node 102 not currently being connected to the storage cluster 100.

TABLE 3

| Node | | Metadata | |
|---|---|---|---|
| N1 | TimeStamp | File A Changes | File B Changes |
| | T1 | — | — |
| | T2 | ΔA12 | — |
| N2 | TimeStamp | File A Changes | File B Changes |
| | T1 | — | — |
| | T2 | ΔA12 | — |
| | T3 | ΔA12 | ΔB12 |
| N3 | TimeStamp | File A Changes | File B Changes |
| | T1 | — | — |
| | T2 | ΔA12 | — |
| | T3 | ΔA12 | ΔB12 |
| N4 | TimeStamp | File A Changes | File B Changes |
| | T1 | — | — |
| | T2 | ΔA12 | — |
| | T3 | ΔA12 | ΔB12 |

At a point in time T4, the file A can be updated yet again on node 104. The node 104 can then provide the updated data for file B to the other nodes 106 and 108 remaining in the storage cluster 100. Each of the nodes 104, 106, and 108 storing the updated file A as respective data 127, 137, and 147 in the respective persistent memories 124, 134, and 136, can hash the metadata for file A to determine the change in file A, such as ΔA23. At this point, the metadata 128 stored within the persistent storage 124 of node 104, the metadata 138 stored within the persistent storage 134 of node 106, and the metadata 148 stored within the persistent storage 144 of node 108 can each have a timestamp entry of T1 without any changes to file A or B, a timestamp entry of T2 with ΔA12 for file A and no change for file B, a timestamp entry of T3 with ΔA12 for file A and ΔB12 for file B, and a timestamp entry of T4 with ΔA23 for file A and ΔB12 for file B as shown in Table 3 below. However, the metadata 118 stored within the non-volatile memory 116 of persistent storage 114 in node 102 can remain the same as previously stored with a timestamp entry of T1 without any changes to file A or B and a timestamp entry of T2 with ΔA12 for file A and no change for file B, as shown in Table 3 below, based on node 102 not currently being connected to the storage cluster 100.

TABLE 4

| Node 5 | | Metadata | |
|---|---|---|---|
| N1 | TimeStamp | File A Changes | File B Changes |
| | T1 | — | — |
| | T2 | ΔA12 | — |
| N2 | TimeStamp | File A Changes | File B Changes |
| | T1 | — | — |
| | T2 | ΔA12 | — |
| | T3 | ΔA12 | ΔB12 |
| | T4 | ΔA23 | ΔB12 |
| N3 | TimeStamp | File A Changes | File B Changes |
| | T1 | — | — |
| | T2 | ΔA12 | — |
| | T3 | ΔA12 | ΔB12 |
| | T4 | ΔA23 | ΔB12 |
| N4 | TimeStamp | File A Changes | File B Changes |
| | T1 | — | — |
| | T2 | ΔA12 | — |
| | T3 | ΔA12 | ΔB12 |
| | T4 | ΔA23 | ΔB12 |

The node 102 can then rejoin storage cluster 100 as shown in FIG. 3. Node 102 can also transfer the data 317 and metadata 318 from the non-volatile memory 116 to the volatile memory 115 as shown in FIG. 3. During a process of the node 102 rejoining the storage cluster 100, the processor 110 of the node 102 can provide a heartbeat to the other nodes 104, 106, and 108 within the storage cluster 100. One of the other nodes 104, 106, or 108 can send node 102 a synchronize message in response to the heartbeat being received from node 102. In this situation, node 102 can send the latest timestamp and metadata, T2 with ΔA12 for file A and no change for file B, to the other nodes 104, 106, and 108. In an embodiment, if the storage cluster 100 is implementing Gen-Z, then the timestamp and metadata can be sent from node 102 to the other nodes 104, 106, and 108 using a broadcast collective as defined by Gen-Z. The nodes 104, 106, and 108 can determine that the data on node 102 is stale based on the timestamp and metadata received from node 102. The nodes 104, 106, and 108 can then send node 102 the transforms for the changes to the files A and B calculated at timestamps T3 and T4 as shown in Table 5 below.

TABLE 5

| | Metadata | |
|---|---|---|
| T3 | ΔA12 | ΔB12 |
| T4 | ΔA23 | ΔB12 |

In an embodiment, if the storage cluster 100 is implementing Gen-Z, the transforms can be sent to node 102 using a scatter collective as defined by Gen-Z. Node 102 can then apply the transforms to update files A and B within the persistent memory 114 of node 102. In an embodiment, if the storage cluster 100 is implementing Gen-Z, the transforms can be applied by the node 102 using a reduce collective as defined by Gen-Z. The update of files A and B can be preformed in two passes based on two timestamp entries being provided to node 102. During the first pass, the processor 110 can preform a transform on file B to update file B to the correct data for timestamp T3 based on the metadata ΔB12 for file B, and can cause the memory controller 112 to store the updated file B in the volatile memory 115. The processor 110 does not perform a transform for file A based on ΔA12 being the same metadata for file A as currently stored in the persistent storage 114.

During a second pass, the processor 110 can preform a transform on file A to update file A to the correct data for timestamp T4 based on the metadata ΔA23 for file A, and can cause the memory controller 112 to store the updated file A in the volatile memory 115. The processor 110 does not perform a transform for file B based on ΔB12 being the same metadata for file B as found in timestamp T3. The metadata 318 for node 102 can then be updated add a timestamp entry of T3 with ΔA12 for file A and ΔB12 for file B and a timestamp entry of T4 with ΔA23 for file A and ΔB12 for file B as shown in Table 6 below.

TABLE 6

| Metadata | | |
| --- | --- | --- |
| Timestamp | File A Changes | File B Changes |
| T1 | — | — |
| T2 | ΔA12 | — |
| T3 | ΔA12 | ΔB12 |
| T4 | ΔA23 | ΔB12 |

Thus, the nodes 102, 104, 106, and 108 can utilize timestamps with hashed metadata to verify data integrity within the storage cluster 100 even when a node with persistent memory is removed and then rejoined with the storage cluster 100. While this description has been with respect to an entire data file, this disclosure can be applied to block or object storage without varying from the scope of the disclosure. In an embodiment with block storage, the identified changes can be in a group of logical blocks or chunks and the hashed metadata can be associated with the changes to the group of logical blocks or chunks. In an embodiment with object storage, the changes and associated metadata can be at an object granularity instead of the entire data file.

Figure 4:
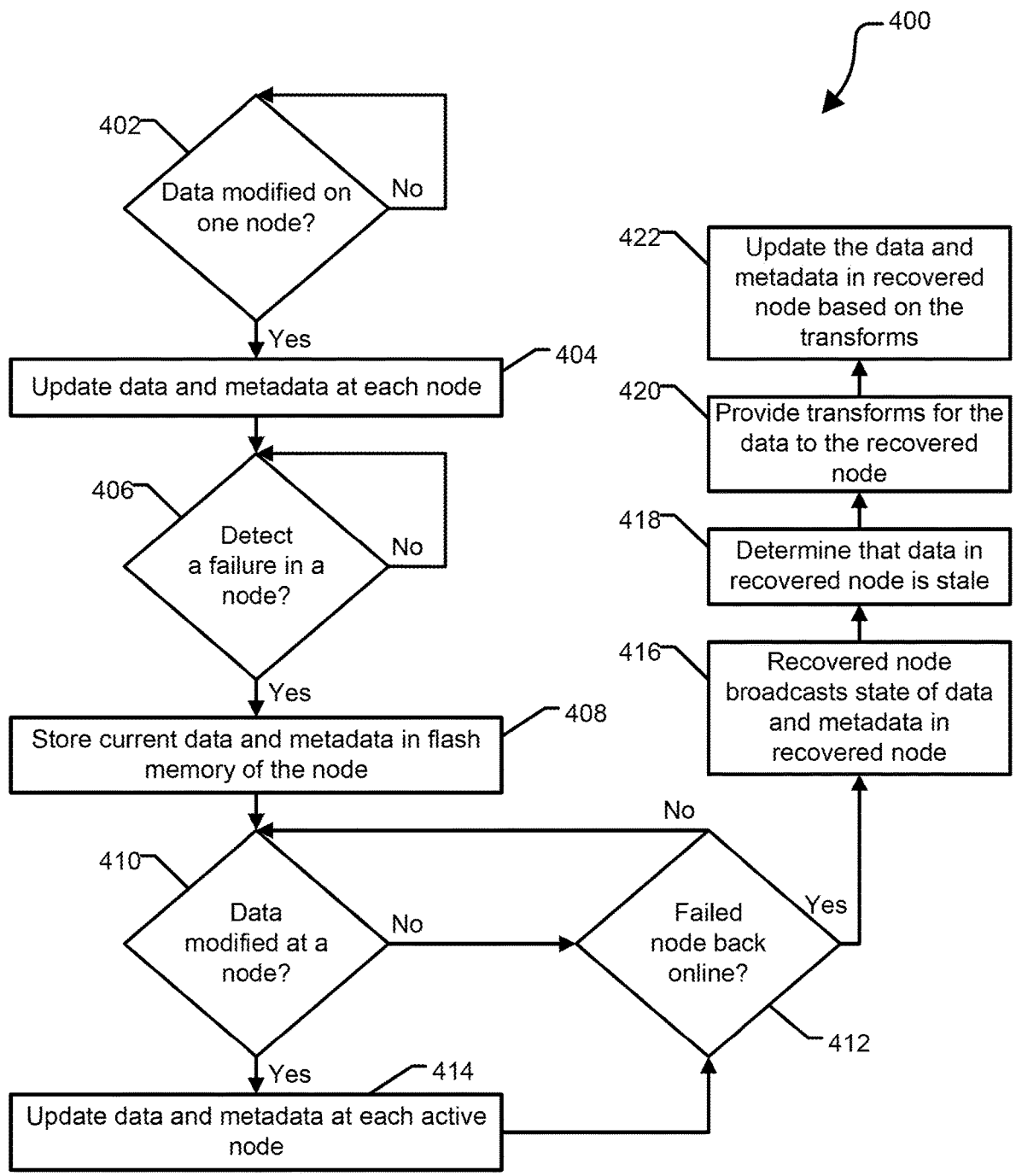
FIG. 4 is a flow diagram of a method for maintaining data coherency between nodes of a storage cluster according to at least one embodiment of the present disclosure.

FIG. 4 is a flow diagram of a method 400 for maintaining data coherency between nodes of a storage cluster according to at least one embodiment of the present disclosure. At block 402, a determination is made whether a data file has been modified on a node of a storage cluster. In an embodiment, the storage cluster can implement Gen Z to enable each of the nodes to communicate with one another even if the nodes are different storage types. In an embodiment, Gen Z can support multiple topologies for the nodes, such as directed attached, switched, fabric, or the like. Gen Z can also be used on various physical layers, such as Ethernet, InfiniBand, or the like.

When a data file changes, the data and metadata for the file are updated at each of the nodes at block 404. In an embodiment, updated data can be provided to the other nodes in the storage cluster can a complete data file, can be provided only as the change in the data, or the like. At block 406, a determination is made whether a failure is detected at a node of the storage cluster. In an embodiment, the failure of the node can be a power loss within the node. When a failure is detected, the current data and current metadata in the volatile memory of the node is stored in the non-volatile or flash memory of the node at block 408.

At block 410, a determination is made whether a data file has been modified on a node remaining within a storage cluster. If a data file has not been modified, the flow continues at block 412 and a determination is made whether the failed node is back online within the storage cluster. If a data file has been modified, the flow continues at block 414 and the data file and metadata for the data file are updated on each of the active nodes within the storage cluster, and the flow continues at block 412. The flow loops between blocks 410, 412, and 414 until the failed node is back online within the storage cluster and the flow then continues at block 416.

At block 416, the recovered node broadcasts a state of the data and metadata within the recovered node to the other nodes of the storage cluster. The other node determines that the data in the recovered node is stale at block 418. At block 420, the nodes provide transforms for the current data to the recovered node. The data and metadata in the recovered node are updated based on the transforms at block 422.

Figure 5:
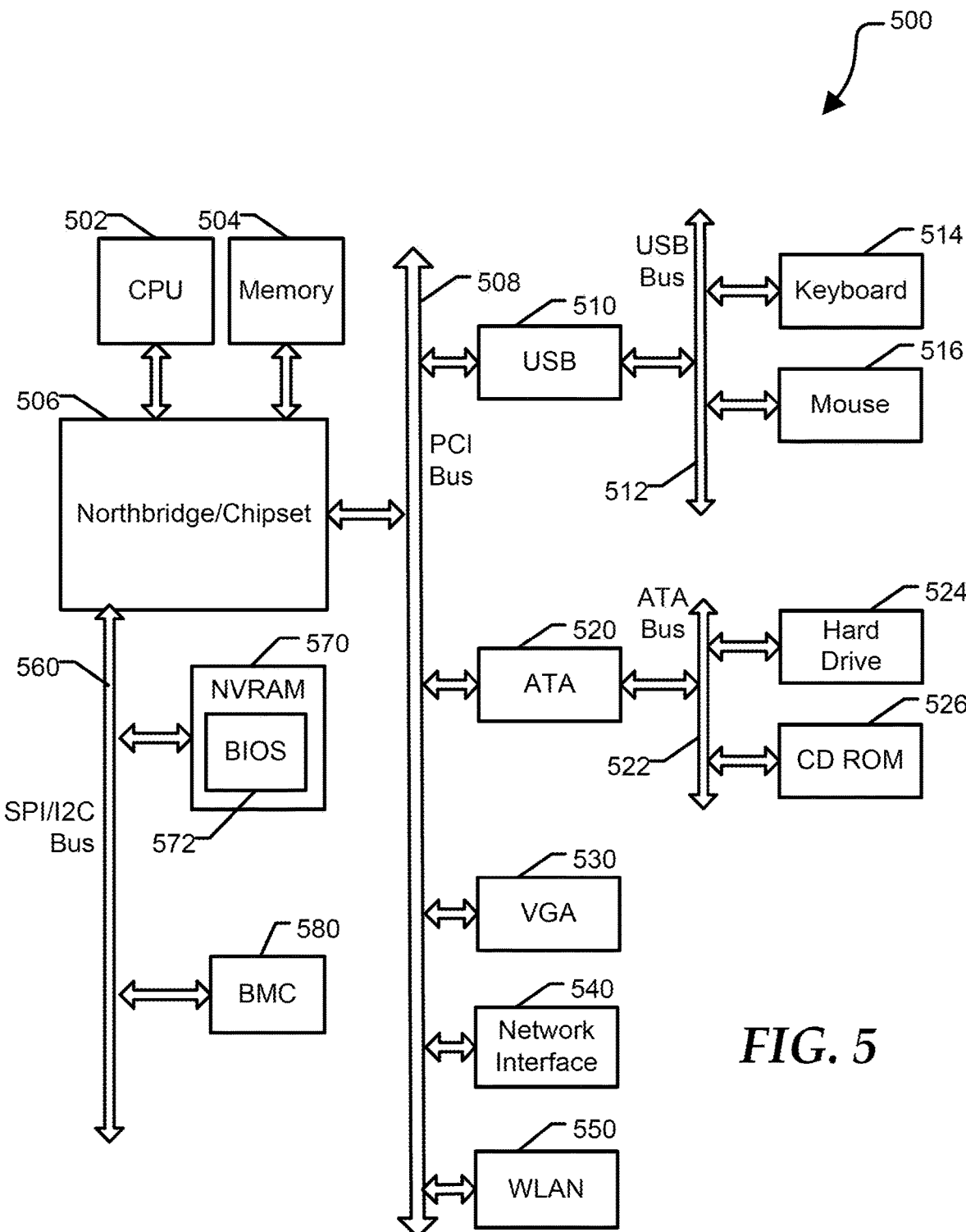
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB bus 512, a keyboard device controller 514, a mouse device controller 516, a configuration an AT attachment (ATA) bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an embodiment, the information handling system 500 can be any of the nodes 102, 104, 106, and 108 of FIGS. 1-3. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a persistent storage including a volatile memory and a non-volatile memory; and
    a memory controller in communication with the persistent storage, the memory controller to store data and metadata for a data file within the volatile memory, wherein the data file is synchronized with corresponding data files stored within other information handling systems of a storage cluster, to update the metadata in response to a change in the data of the data file, to store the data and the metadata for the data file within the non-volatile memory prior to a power loss of the information handling system, and in response to the information handling system being back online, the memory controller to:
        transfer the data and the metadata for the data file from the non-volatile memory to the volatile memory;
        send the metadata including a latest timestamp for the data file to the other information handling systems of the storage cluster;
        receive a first transform calculated for changes to the data of the data file at a first timestamp, wherein the first timestamp is later than the latest timestamp;
        receive a second transform calculated for changes to the data of the data file at a first second timestamp, wherein the second timestamp is later than the first timestamp;
        determine, during a first pass, whether first metadata for the data file at the first timestamp, is the same as the metadata for the data file currently stored in the volatile memory, wherein no update transform is performed based on the first metadata being the same as the metadata;
        perform, during a second pass, a transform on the data file to update the data file to correct data at the second timestamp;
        store the updated data file in the volatile memory; and
        update the metadata for the data file to add a first timestamp entry with the first timestamp and with the changes to the data file at the first timestamp, and to add a second timestamp entry with the second timestamp and with the changes to the data file at the second timestamp.

2. The information handling system of claim 1, further comprising:
    a processor to communicate with the other information handling systems within the storage cluster, and to provide a heartbeat to the other information handling systems.

3. The information handling system of claim 2, wherein the sending of the metadata including the latest timestamp for the data file to the other information handing systems of the storage cluster includes, the processor to broadcast a state of the data and metadata for the data file to the other information handling systems in the storage cluster in response to the information handling system being back online within the storage cluster.

4. The information handling system of claim 3, wherein the processor to receive the first and second transforms for the data file from the other information handling systems in response to the broadcast.

5. The information handling system of claim 1, wherein the memory controller to further store a current timestamp and a change of the data of the data file in response to the data file being updated.

6. The information handling system of claim 5, wherein the change of the data for the current timestamp is based on the data of a previous timestamp.

7. A method comprising:
    detecting that a data file is updated on a first of a plurality of nodes of a storage cluster;
    updating data and metadata for the data file on each node of the storage cluster;
    detecting a failure of the first node of the storage cluster;
    storing the data and the metadata for the data file in a non-volatile memory of the first node before the first node is offline;
    updating the data and the metadata for the data file on another node remaining in the storage cluster in response to a change of the data file after the first node is offline;
    detecting that the first node is back online;
    in response to the first node being back online:
        transferring the data and the metadata for the data file from the non-volatile memory to a volatile memory;
        sending the metadata including a latest timestamp for the data file to the other nodes of the storage cluster;
        receiving a first transform calculated for changes to the data of the data file at a first timestamp, wherein the first timestamp is later than the latest timestamp;
        receiving a second transform calculated for changes to the data of the data file at a second timestamp, wherein the second timestamp is later than the first timestamp;
        determining, during a first pass, whether first metadata for the data file at the first timestamp is the same as the metadata for the data file currently stored in the volatile memory, wherein no update transform is performed based on the first metadata being the same as the metadata,
        performing, during a second pass, a transform on the data file to update the data file to correct data at the second timestamp;
        storing the updated data file in the volatile memory; and
        updating the metadata for the data file to add a first timestamp entry with the first timestamp and with the changes to the data file at the first timestamp, and to add a second timestamp entry with the second timestamp and with the changes to the data file at the second timestamp.

8. The method of claim 7, wherein the data and the metadata are utilized by each node of the storage cluster to verify data integrity within the storage cluster.

9. The method of claim 8, wherein the sending of the metadata including the latest timestamp for the data file to the other nodes of the storage cluster further comprises:
broadcasting a state of the data and metadata for the data file within the first node to the other nodes in the storage cluster in response to the first node being back online within the storage cluster.

10. The method of claim 8, further comprising:
determining that the data and metadata for the data file within the first node is stale based on the state broadcasted; and
providing the first and second transforms for the data file to the first node in response to determining that the data and the metadata are stale.

11. The method of claim 7, further comprising:
storing a current timestamp and a change of the data in the volatile memory in response to the data file being updated.

12. The method of claim 11, wherein the change of the data for the current timestamp is based on the data of a previous timestamp.

13. A storage cluster comprising:
a first node including:
a first persistent storage including a first volatile memory and a first non-volatile memory; and
a first memory controller in communication with the first persistent storage, the first memory controller to store data and metadata for a data file within the first volatile memory, to update the metadata in response to a change in the data of the data file; and
a second node including:
a second persistent storage including a second volatile memory and a second non-volatile memory; and
a second memory controller in communication with the second persistent storage, the second memory controller to:
store data and metadata for the data file within the second volatile memory, wherein the data and metadata for the data file within the second volatile memory are synchronized within the data and metadata for the data file within the first volatile memory;
update the metadata in response to a change in the data of the data file;
store the data and the metadata for the data file within the second non-volatile memory prior to a power loss of the information handling system; and
in response to the second node being back online, the second memory controller to:
transfer the data and the metadata for the data file from the second non-volatile memory to the second volatile memory;
send the metadata including a latest timestamp for the data file to the first node;
receive a first transform calculated for changes to the data of the data file at a first timestamp, wherein the first timestamp is later than the latest timestamp;
receive a second transform calculated for changes to the data of the data file at a second timestamp, wherein the second timestamp is later than the first timestamp;
determine, during a first pass, whether first metadata for the data file at the first timestamp is the same as the metadata for the data file currently stored in the second volatile memory, wherein no update transform is performed based on the first metadata being the same as the metadata;
perform, during a second pass, a transform on the data file to update the data file to correct data at the second timestamp;
store the updated data file in the volatile memory; and
update the metadata for the data file to add a first timestamp entry with the first timestamp and with the changes to the data file at the first timestamp, and to add a second timestamp entry with the second timestamp and with the changes to the data file at the second timestamp.

14. The storage cluster of claim 13, wherein the first node further comprises a first processor to communicate with the second node, and to provide a heartbeat to the second node, and wherein the second node further comprises a second processor to communicate with the first node, and to provide a heartbeat to the first node.

15. The storage cluster of claim 14, wherein the sending of the metadata including the latest timestamp for the data file to the first node includes, the second processor to broadcast a state of the data and metadata for the data file to the first node in response to the second node being back online within the storage cluster.

16. The storage cluster of claim 15, wherein the second processor to receive the first and second transforms for the data file from the first node in response to the broadcast.

17. The storage cluster of claim 13, wherein the second memory controller to further store a current timestamp and a change of the data of the data file in response to the data file being updated.

18. The storage cluster of claim 17, wherein the change of the data for the current timestamp is based on the data of a previous timestamp.

* * * * *

UNITED STATES PATENT AND TRADEMARK OFFICE
CERTIFICATE OF CORRECTION

PATENT NO. : 10,846,183 B2
APPLICATION NO. : 16/004822
DATED : November 24, 2020
INVENTOR(S) : Balaji Bapu Gururaja Rao et al.

Page 1 of 1

It is certified that error appears in the above-identified patent and that said Letters Patent is hereby corrected as shown below:

In the Claims

Column 11, Line 49: Please change "at a first second timestamp" to --at a second timestamp--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*